United States Patent
Pan et al.

(10) Patent No.: US 10,630,945 B2
(45) Date of Patent: Apr. 21, 2020

(54) PROJECTION DEVICE AND LIGHT ENGINE MODULE

(71) Applicant: Coretronic Corporation, Hsin-Chu (TW)

(72) Inventors: Haw-Woei Pan, Hsin-Chu (TW); Chi-Tang Hsieh, Hsin-Chu (TW); Chih-Hsien Tsai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/253,254

(22) Filed: Jan. 22, 2019

(65) Prior Publication Data
US 2019/0246080 A1    Aug. 8, 2019

(30) Foreign Application Priority Data

Feb. 2, 2018  (CN) .......................... 2018 1 0106028

(51) Int. Cl.
| | | |
|---|---|---|
| H04N 9/31 | (2006.01) | |
| H04N 5/74 | (2006.01) | |
| G02B 26/08 | (2006.01) | |
| G03B 21/20 | (2006.01) | |
| G03B 33/12 | (2006.01) | |
| G03B 21/14 | (2006.01) | |
| G02B 27/14 | (2006.01) | |

(52) U.S. Cl.
CPC ....... *H04N 9/3114* (2013.01); *G02B 26/0833* (2013.01); *G02B 27/141* (2013.01); *G03B 21/142* (2013.01); *G03B 21/204* (2013.01); *G03B 21/208* (2013.01); *G03B 33/12* (2013.01); *H04N 5/7458* (2013.01)

(58) Field of Classification Search
CPC .... G03B 21/14; G03B 21/142; G03B 21/208; G03B 21/204; G03B 21/005; G03B 21/006; G03B 21/008; G03B 33/12; H04N 9/31; H04N 9/3114; H04N 5/7458
See application file for complete search history.

(56) References Cited

U.S. PATENT DOCUMENTS

| | | |
|---|---|---|
| 2001/0040670 A1 | 11/2001 | Fielding |
| 2002/0140905 A1 | 10/2002 | Ouchi et al. |
| 2003/0133079 A1 | 7/2003 | Cobb |
| 2008/0088800 A1* | 4/2008 | Bellis ................... H04N 9/3147 353/30 |
| 2014/0347634 A1 | 11/2014 | Bommerbach et al. |
| 2017/0357151 A1* | 12/2017 | Okuda ................. G03B 21/204 |
| 2019/0196315 A1* | 6/2019 | Pan ..................... G02B 27/1053 |
| 2019/0227418 A1* | 7/2019 | Chang ..................... G02B 27/10 |

* cited by examiner

*Primary Examiner* — William C. Dowling

(57) ABSTRACT

A projection device and a light engine module thereof are provided. The light engine module includes a first dichroic element, a first light valve, a second light valve, a light combining element, a first light converging element, a second light converging element, a first light guiding element, and a second light guiding element. The first dichroic element divides an illumination beam into a first color beam and a second color beam. The first light valve converts the first color beam into a first image beam. The second light valve converts the second color beam into a second image beam. The light combining element is disposed on transmission paths of the first image beam and the second image beam. The first light guiding element guides the first color beam to the first light valve.

19 Claims, 6 Drawing Sheets

PROJECTION DEVICE AND LIGHT ENGINE MODULE

CROSS-REFERENCE TO RELATED APPLICATION

THIS APPLICATION CLAIMS THE PRIORITY BENEFIT OF CHINA APPLICATION (CN201810106028.1 FILED ON 2018 Feb. 2). THE ENTIRETY OF THE ABOVE-MENTIONED PATENT APPLICATION IS HEREBY INCORPORATED BY REFERENCE HEREIN AND MADE A PART OF THIS SPECIFICATION.

FIELD OF THE INVENTION

The invention relates to a display device, and more particularly to a projection device and a light engine module thereof.

BACKGROUND OF THE INVENTION

The type of a light source used by a projection device is evolved from an ultra-high pressure mercury lamp (UHP lamp), a light emitting diode (LED) to a laser diode (LD) in the wake of the market requirements on the projection device for luminance, color saturation, service life, and non-toxic environmental protection, etc.

In the field of high-luminance projection, the luminance of a projection system with a single digital micromirror device (DMD) is more difficult to meet the demand. In addition, the expensive price of the digital micromirror device leads to poor overall competitiveness of the product.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a projection device, so as to take into account both projection luminance and production costs.

The invention provides a light engine module, so as to take into account both projection luminance and production costs.

Other objectives and advantages of the invention can be further understood from the technical features disclosed in the invention.

In order to achieve one or a portion of or all of the objectives or other objectives, a projection device provided in an embodiment of the invention includes a light source module, a light engine module, and a projection lens. The light source module is used for providing an illumination beam. The light engine module includes a first dichroic element, a first light valve, a second light valve, a light combining element, a first light converging element, a second light converging element, a first light guiding element, and a second light guiding element. The illumination beam comprises a first wavelength range and a second wavelength range. The first dichroic element is disposed on a transmission path of the illumination beam and is used for dividing the illumination beam into a first color beam and a second color beam. The first color beam comprises the first wavelength range. The second color beam comprises the second wavelength range. The first wavelength range of the illumination beam passes through the first dichroic element to form the first color beam. The second wavelength range of the illumination beam is reflected by the first dichroic element to form the second color beam. The first light valve is disposed on a transmission path of the first color beam and is used for converting the first color beam into a first image beam. The second light valve is disposed on a transmission path of the second color beam and is used for converting the second color beam into a second image beam. The light combining element is disposed on transmission paths of the first image beam from the first light valve and the second image beam from the second light valve. The first light converging element is disposed between the first light valve and the light combining element. The second light converging element is disposed between the second light valve and the light combining element. The first light guiding element is disposed among the first dichroic element, the first light valve and the light combining element, and is used for guiding the first color beam to the first light valve. The second light guiding element is disposed among the first dichroic element, the second light valve and the light combining element, and is used for guiding the second color beam to the second light valve. The projection lens is disposed on a transmission path of the first image beam and the second image beam from the light combining element. The light combining element is disposed among the projection lens, the first light valve and the second light valve. The light combining element is disposed among the projection lens, the first light converging element and the second light converging element. And the light combining element is disposed among the projection lens, the first light guiding element and the second light guiding element.

In order to achieve one or a portion of or all of the objectives or other objectives, a light engine module provided in an embodiment of the invention includes a first dichroic element, a first light valve, a second light valve, a light combining element, a first light converging element, a second light converging element, a first light guiding element and a second light guiding element. The first dichroic element is used for dividing the illumination beam into a first color beam and a second color beam. The illumination beam comprises a first wavelength range and a second wavelength range. The first color beam comprises the first wavelength range. The second color beam comprises the second wavelength range. The first wavelength range of the illumination beam passes through the first dichroic element to form the first color beam. The second wavelength range of the illumination beam is reflected by the first dichroic element to form the second color beam. The first light valve is disposed on a transmission path of the first color beam and is used for converting the first color beam into a first image beam. The second light valve is disposed on a transmission path of the second color beam and is used for converting the second color beam into a second image beam. The light combining element is disposed on transmission paths of the first image beam from the first light valve and the second image beam from the second light valve. The first light converging element is disposed between the first light valve and the light combining element. The second light converging element is disposed between the second light valve and the light combining element. The first light guiding element is disposed among the first dichroic element, the first light valve and the light combining element, and is used for guiding the first color beam to the first light valve. The second light guiding element is disposed among the first dichroic element, the second light valve and the light combining element, and is used for guiding the second color beam to the second light valve.

The light engine module of the embodiment of the invention can meet the projection requirements for high luminance due to the use of the architecture of two light valves. In addition, since the light engine module has the first light converging element, disposed between the first light valve and the light combining element, and the second light converging element disposed between the second light valve and the light combining element, the converted first image beam from the first light valve and the converted second image beam from the second light valve are reduced in opening angles after passing through the first light converging element and the second light converging element, respectively. Therefore, a size of the light combining element can be reduced. As such, an overall volume of the light engine module can be reduced, and a space, in the light engine module, used for avoiding light interference can be reduced/omitted. When the light engine module is applied to the projection device, the back focal length (BFL) can be shortened, and the design difficulty of the projection lens can be reduced. Besides, since a light spot of an image beam incident on the projection lens is reduced, a lens with a smaller diameter may be selected and used for a lens located at a light incident side (a side facing toward the light combining element) of the projection lens. This way is helpful in selecting and using a projection lens with a smaller volume and can reduce manufacturing costs. Therefore, the projection device of the embodiment of the invention can meet projection requirements of high luminance, low production costs, and a downsized overall volume.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
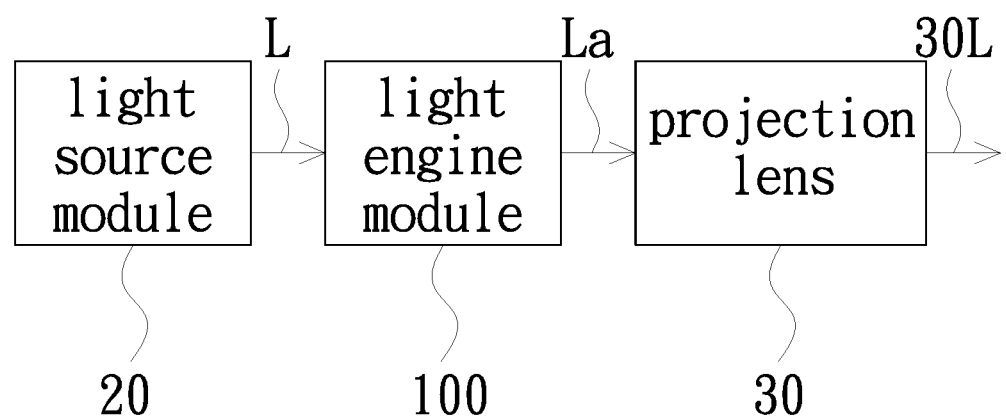
FIG. 1 is a schematic block diagram of a projection device in accordance with an embodiment of the invention.

FIG. 1 is a schematic block diagram of a projection device in accordance with an embodiment of the invention. Please refer to FIG. 1. A projection device 10 of the embodiment includes a light source module 20, a light engine module 100, and a projection lens 30. The light engine module 100 is disposed between the light source module 20 and the projection lens 30. The light source module 20 is used for providing an illumination beam L to the light engine module 100. The light engine module 100 is disposed on a transmission path of the illumination beam L to convert the illumination beam L into an image beam La. The projection lens 30 is disposed on a transmission path of the image beam La. The image beam La is used for passing through the projection lens 30 so that a projection beam 30L is formed by the projection lens 30. The projection lens 30 is used for projecting the projection beam 30L onto a screen or a wall (not shown in the figure). The detailed structure and embodiment of the light engine module 100 shown in FIG. 1 are further described below.

Figure 2:
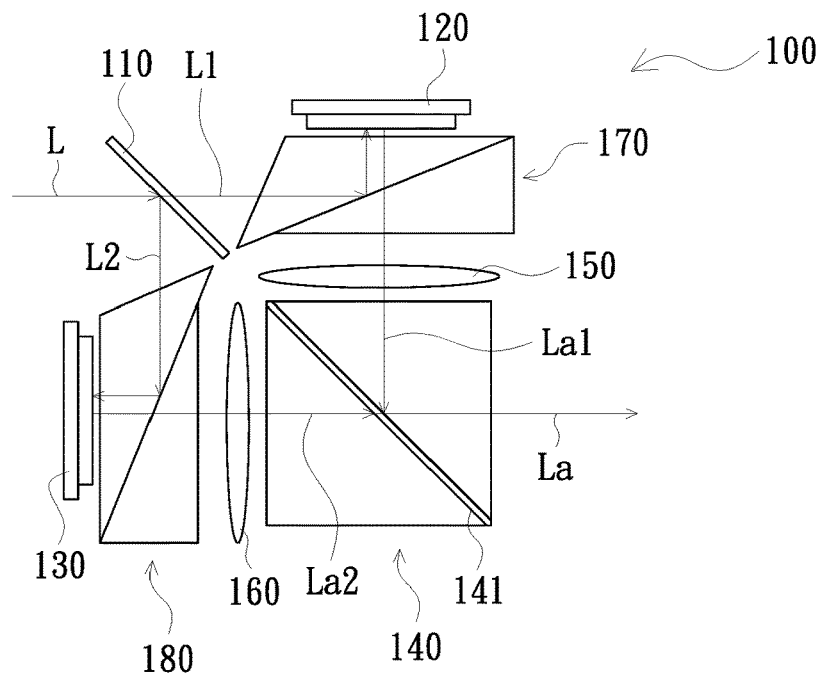
FIG. 2 is a schematic diagram of a light engine module in accordance with an embodiment of the invention.

FIG. 2 is a schematic diagram of a light engine module in accordance with an embodiment of the invention. Please refer to FIG. 2. The light engine module 100 of the embodiment includes a first dichroic element 110, a first light valve 120, a second light valve 130, a light combining element 140, a first light converging element 150, a second light converging element 160, a first light guiding element 170 and a second light guiding element 180. In the embodiment, the first light converging element 150/the second light converging element 160 is, for example, a convex lens, but not limited thereto. The first dichroic element 110 is disposed on the transmission path of the illumination beam L, and is used for dividing the illumination beam L into a first color beam L1 and a second color beam L2. The first color beam L1 is used for passing through the first dichroic element 110. The second color beam L2 is used for being reflected by the first dichroic element 110. The first light valve 120 is disposed on a transmission path of the first color beam L1, and is used for converting the first color beam L1 into a first image beam La1. The second light valve 130 is disposed on a transmission path of the second color beam L2, and is used for converting the second color beam L2 into a second image beam La2. The light combining element 140 is disposed on transmission paths of the first image beam La1 from the first light valve 120 and the second image beam La2 from the second light valve 130. The first light converging element 150 is disposed between the first light valve 120 and the light combining element 140. The second light converging element 160 is disposed between the second light valve 130 and the light combining element 140. The first light guiding element 170 is disposed among the first dichroic element 110, the first light valve 120 and the light combining element 140, and is used for guiding the first color beam L1 to the first light valve 120. The second light guiding element 180 is disposed among the first dichroic element 110, the second light valve 130 and the light combining element 140, and is used for guiding the second color beam L2 to the second light valve 130.

In the embodiment, the first light converging element 150 is, for example, disposed between the light combining element 140 and the first light guiding element 170, and the second light converging element 160 is, for example, disposed between the light combining element 140 and the second light guiding element 180. In addition, in the embodiment, the first light valve 120 and the second light valve 130 are reflective light valves, such as a digital micromirror device (DMD), a liquid crystal display (LCD), or a liquid crystal on silicon panel (LCOS panel), but not limited thereto.

The first light guiding element 170 of the embodiment is, for example, a first total internal reflection prism (TIR prism), and the second light guiding element 180 is, for example, a second total internal reflection prism. The first light guiding element 170 is used for reflecting the first color beam L1 to the first light valve 120, and is used for allowing the first image beam La1 from the first light valve 120 to pass therethrough to be transmitted to the light combining element 140. The second light guiding element 180 is used for reflecting the second color beam L2 to the second light valve 130, and is used for allowing the second image beam La2 from the second light valve 130 to pass therethrough to be transmitted to the light combining element 140.

The light combining element 140 of the embodiment is, for example, a light combining prism, which has a dichroic film 141. In an embodiment, the dichroic film 141 is, for example, a plated film, but is not limited thereto. The first image beam La1 from the first light valve 120 is reflected by the dichroic film 141, and the second image beam La2 from the second light valve 130 passes through the dichroic film 141. The first image beam La1, reflected by the dichroic film 141, and the second image beam La2 passing through the dichroic film 141 are transmitted toward a same direction and combined into the image beam La. In another embodiment, the light combining element 140 may also adopt a dichroic sheet. In an embodiment, the dichroic sheet is, for example, an optical film or an optical sheet, but is not limited thereto. In addition, in the embodiment where the light combining element 140 is a light combining prism, the first light converging element 150 and the second light converging element 160 may also be disposed on two surfaces of the light combining element 140. For example, the first light converging element 150 and the second light converging element 160 may choose to use plano-convex lenses, and be connected to two surfaces of the light combining element 140 by planes, respectively. Alternatively, the first light converging element 150, the second light converging element 160 and the light combining element 140 are, for example, integrally formed into one, and then two light-converging convex surfaces of the light combining element 140 can be used as the first light converging element 150 and the second light converging element 160 described above. In the embodiment, the first light converging element 150 and the second light converging element 160 are, for example, disposed on two adjacent surfaces of the light combining element 140, but are not limited thereto.

Please concurrently refer to FIG. 1 and FIG. 2. The projection lens 30 of the embodiment is disposed on a transmission path of the image beam La (i.e., the first image beam La1 and the second image beam La2) from the light combining element 140. The light combining element 140 is disposed among the projection lens 30, the first light valve 120, and the second light valve 130. The light combining element 140 is disposed among the projection lens 30, the first light converging element 150, and the second light converging element 160. And the light combining element 140 is disposed among the projection lens 30, the first light guiding element 170 and the second light guiding element 180. In another embodiment, the light combining element 140 may also be used for reflecting the second image beam La2 from the second light valve 130 and be used for allowing the first image beam La1 from the first light valve 120 to pass therethrough. A position of the projection lens 30 is correspondingly adjusted to receive the image beam La (i.e., the first image beam La1 and the second image beam La2) from the light combining element 140.

In an embodiment, the image beam La includes, for example, image beams of three colors (such as red, green, and blue) to display color images. The first image beam La1/the second image beam La2 includes, for example, beams of two colors, but is not limited thereto. The following will explain how to configure the first image beam La1/the second image beam La2 to include beams of two colors.

Figure 3:
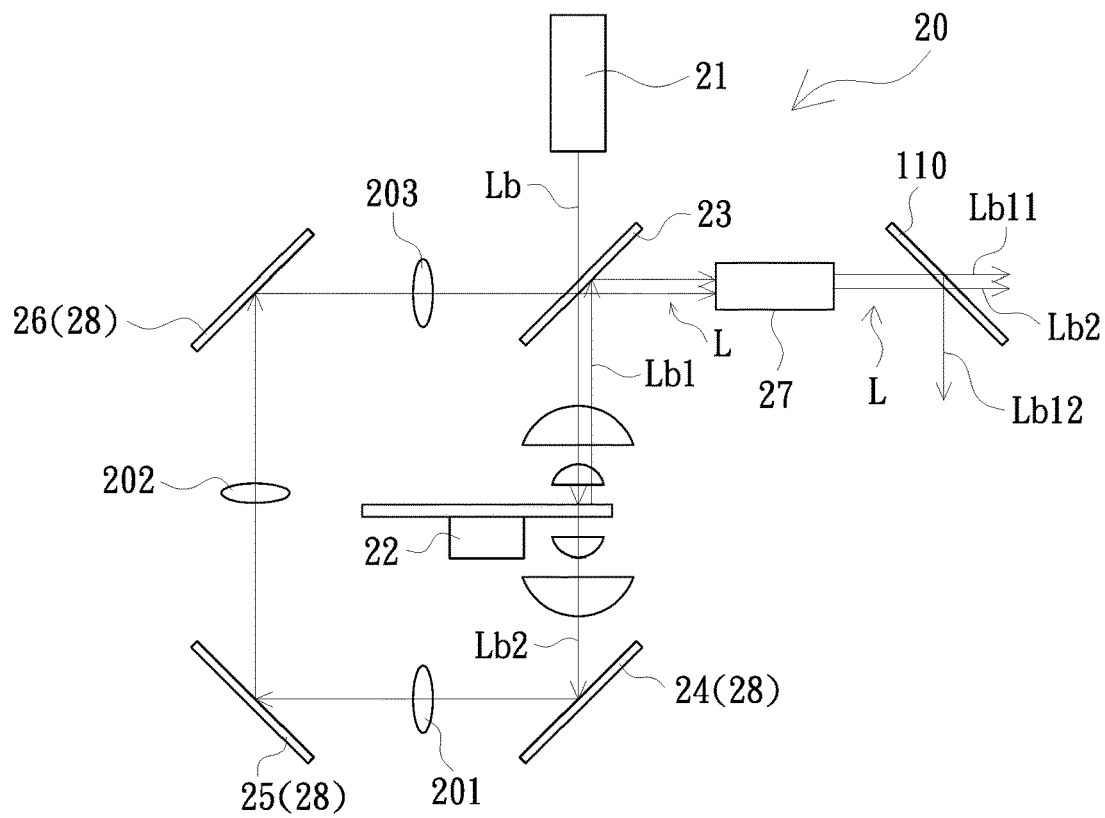
FIG. 3 is a schematic diagram of a light source module and a first dichroic element in accordance with an embodiment of the invention.

FIG. 3 is a schematic diagram of a light source module and a first dichroic element in accordance with an embodiment of the invention. Please refer to FIG. 3. The light source module 20 of the embodiment includes an excitation light source 21, a wavelength conversion element 22, a second dichroic element 23, and a reflective element group 28. The excitation light source 21 is used for providing an excitation beam Lb. In the embodiment, the excitation light source 21 is, for example, a laser light source, a light emitting diode light source, or other solid state light source, but is not limited thereto. The wavelength conversion element 22 is disposed on a transmission path of the excitation beam Lb and is used for converting a first portion of the excitation beam Lb into a conversion beam Lb1 and reflecting the conversion beam Lb1, and allowing a second portion Lb2 of the excitation beam Lb to pass therethrough. The wavelength conversion element 22 is, for example, a phosphor wheel and has a phosphor block (not shown in the figure) and a penetration block (not shown in the figure), but is not limited thereto. When the wavelength conversion element 22 rotates, the excitation beam Lb alternately irradiates the phosphor block and the penetration block. The abovementioned first portion of the excitation beam Lb represents the excitation beam Lb irradiating the phosphor block of the wavelength conversion element 22. The abovementioned second portion Lb2 of the excitation beam Lb represents the excitation beam Lb irradiating the penetration block. In other words, the first portion of the excitation beam Lb and the second portion Lb2 of the excitation beam Lb do not mean that the excitation light source 21 has two kinds of beams or two beams. The first portion of the excitation beam Lb and the second portion Lb2 of the excitation beam Lb represent the same beam from the same excitation light source 21 irradiating the phosphor block and the penetration block in different time periods. For convenience, the excitation beam Lb irradiating different blocks of the wavelength conversion element 22 in different time periods defines the first portion of the excitation beam Lb and the second portion Lb2 of the excitation beam Lb. In the embodiment, the first portion of the excitation beam Lb irradiates the phosphor block and is reflected by the phosphor block, and the second portion Lb2 of the excitation beam Lb irradiates the penetration block and passes through the wavelength conversion element 22. The excitation beam Lb and the second portion Lb2/the first portion thereof are, for example, blue light (first sub-wavelength range). The conversion beam Lb1 is, for example, yellow light. In addition, the phosphor block may also have phosphors of a plurality of colors, so that the conversion beam Lb1 is divided into a plurality of colors in order of time.

The second dichroic element 23 is disposed between the excitation light source 21 and the wavelength conversion element 22, and is used for allowing the second portion Lb2 of the excitation beam Lb to pass therethrough and is used for reflecting the conversion beam Lb1. The reflective element group 28 of FIG. 3 includes, for example, three reflective elements 24, 25 and 26, such as reflection mirrors, but is not limited thereto. The reflective element group 28 is disposed on a transmission path of the second portion Lb2 of the excitation beam Lb, and is used for reflecting the second portion Lb2 of the excitation beam Lb to the second dichroic element 23 to allow the second portion Lb2 of the excitation beam Lb to pass through the second dichroic element 23. Then, the second portion Lb2 of the excitation beam Lb passing through the second dichroic element 23 and the conversion beam Lb1 reflected by the second dichroic element 23 are transmitted toward a same direction to form the illumination beam L. That is, the illumination beam L of the embodiment is composed of the conversion beam Lb1 and the second portion Lb2 of the excitation beam Lb.

The first dichroic element 110 is used for dividing the conversion beam Lb1 in the illumination beam L into a first sub-beam Lb11 and a second sub-beam Lb12 having different colors (for example, red (second sub-wavelength range) and green (second wavelength range)), and is used for allowing the first sub-beam Lb11 and the second portion Lb2 of the excitation beam Lb to pass therethrough, and is used for reflecting the second sub-beam Lb12. As such, the first color beam L1 in FIG. 2 is composed of, for example, the first sub-beam Lb11 and the second portion Lb2 of the excitation beam Lb, and the second color beam L2 is composed of, for example, the second sub-beam Lb12, but not limited thereto. In other words, the first color beam L1 includes, for example, beams of two colors, and the second color beam L2 includes, for example, a beam of one color, but are not limited thereto. The first color beam L1 has a first wavelength range. The first wavelength range includes the first sub-wavelength range (blue) and the second sub-wavelength range (red). The second color beam L2 has the second wavelength range (green). Referring to FIG. 2, the illumination beam comprises a first wavelength range and a second wavelength range. In other words, the illumination beam L is a beam with the first wavelength range and the second wavelength range.

In another embodiment, the first dichroic element 110 is used for allowing the first sub-beam Lb11 to pass therethrough, and is used for reflecting the second sub-beam Lb12 and the second portion Lb2 of the excitation beam Lb, so that the first color beam L1 is composed of, for example, the first sub-beam Lb11, and the second color beam L2 is composed of, for example, the second sub-beam Lb12 and the second portion Lb2 of the excitation beam Lb, but are not limited thereto.

The light source module 20 may further include a plurality of lenses or other optical elements, such as lenses 201, 202, and 203. The lenses 201, 202 and 203 are disposed on a transmission path of the second portion Lb2 of the excitation beam Lb. In addition, the light source module 20 may further include a light homogenizing device 27, such as a light integration rod or a lens array, but not limited thereto. The light homogenizing device 27 is disposed on a transmission path of the illumination beam L.

In the projection device 10 of the embodiment, since the light engine module 100 adopts the architecture of two light valves, the projection requirements for high luminance can be met. In addition, since the first light converging element 150 is disposed between the first light valve 120 and the light combining element 140, and the second light converging element 160 is disposed between the second light valve 130 and the light combining element 140, the first image beam La1 and the second image beam La2 are reduced in opening angles when passing through the first light converging element 150 and the second light converging element 160 respectively. Therefore, a size of the light combining element 140 can be reduced, so that a space which needs to be reserved to avoid light interference can be reduced. Thus, a back focal length can be shortened, and design difficulty of the projection lens 30 can further be reduced. In addition, since a light spot of the image beam La projected on the projection lens 30 is reduced, a lens with a smaller diameter can be selected and used for a lens located at a light incident side (a side facing toward the light combining element 140) of the projection lens 30. This way is helpful in selecting and using the projection lens 30 with a smaller volume and reducing a manufacturing cost.

Figure 4A:
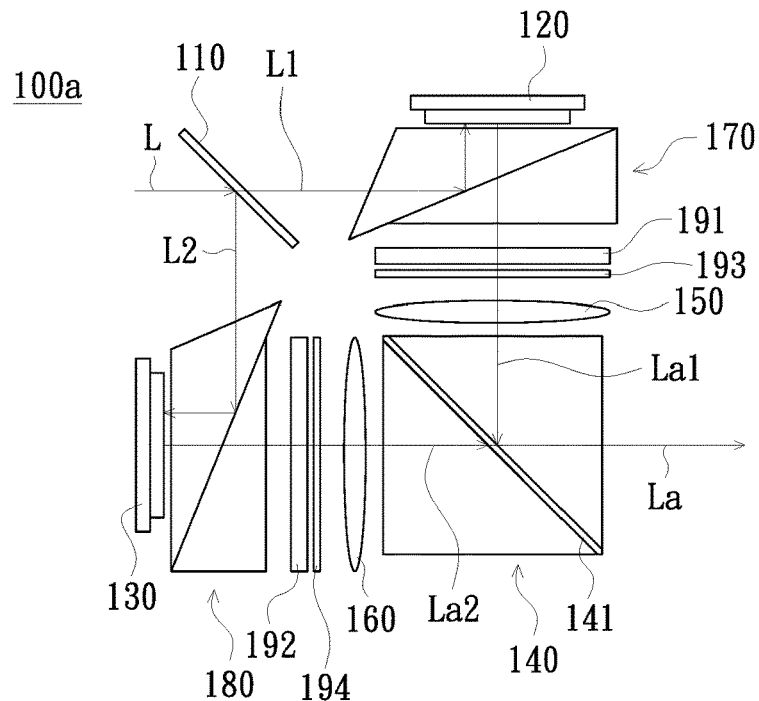
FIG. 4A is a schematic diagram of a light engine module in accordance with another embodiment of the invention.

FIG. 4A is a schematic diagram of a light engine module in accordance with another embodiment of the invention. Please refer to FIG. 4A. Structures and advantages of a light engine module 100a of the embodiment and the light engine module 100 are similar. The following describes main differences in their structures. The light engine module 100a of the embodiment further includes, for example, a first light path adjusting element 193 and a second light path adjusting element 194. The first light path adjusting element 193 is disposed beside the first light valve 120 and located on a transmission path of the first image beam La1. The second light path adjusting element 194 is disposed beside the second light valve 130 and located on a transmission path of the second image beam La2. Specifically, the first light path adjusting element 193 is, for example, disposed between the first light converging element 150 and the first light guiding element 170, and the second light path adjusting element 194 is, for example, disposed between the second light converging element 160 and the second light guiding element 180. In the embodiment, the first light path adjusting element 193 and the second light path adjusting element 194 are optical elements/assemblies whose angles are slightly rotatable when operated/actuated by an actuator, so that the incident first image beam La1 and the incident second image beam La2 can correspond to different rotation angles and engender deviation/deflection. The image resolution of projection pictures can thereby be improved.

The light engine module 100a of the embodiment may further include a first cover sheet 191 and a second cover sheet 192. The first cover sheet 191 is, for example, disposed between the first light guiding element 170 and the first light path adjusting element 193. The second cover sheet 192 is, for example, disposed between the second light guiding element 180 and the second light path adjusting element 194. The first cover sheet 191 and the second cover sheet 192 are, for example, cover glass for providing a dust-proof function.

Figure 4B:
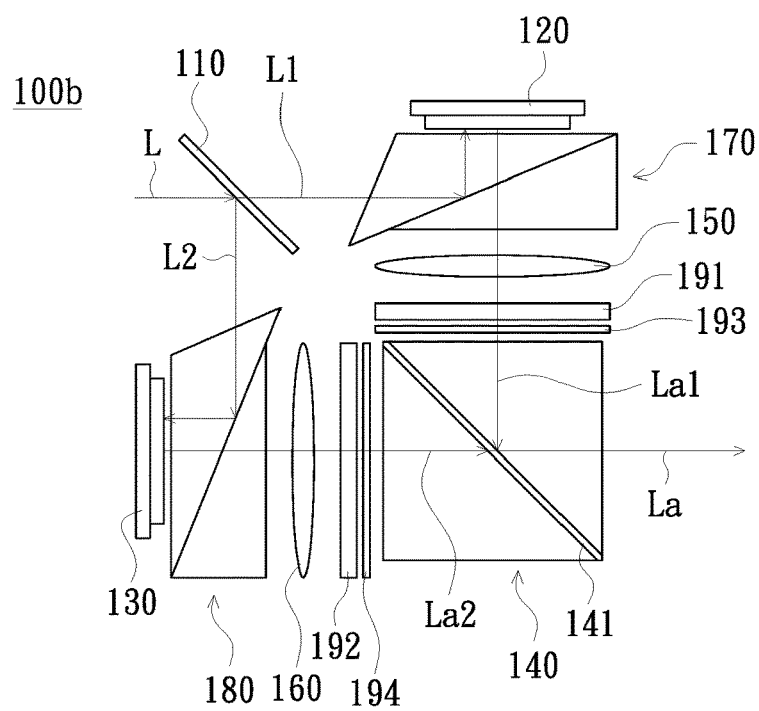
FIG. 4B is a schematic diagram of a light engine module in accordance with another embodiment of the invention.
Figure 4C:
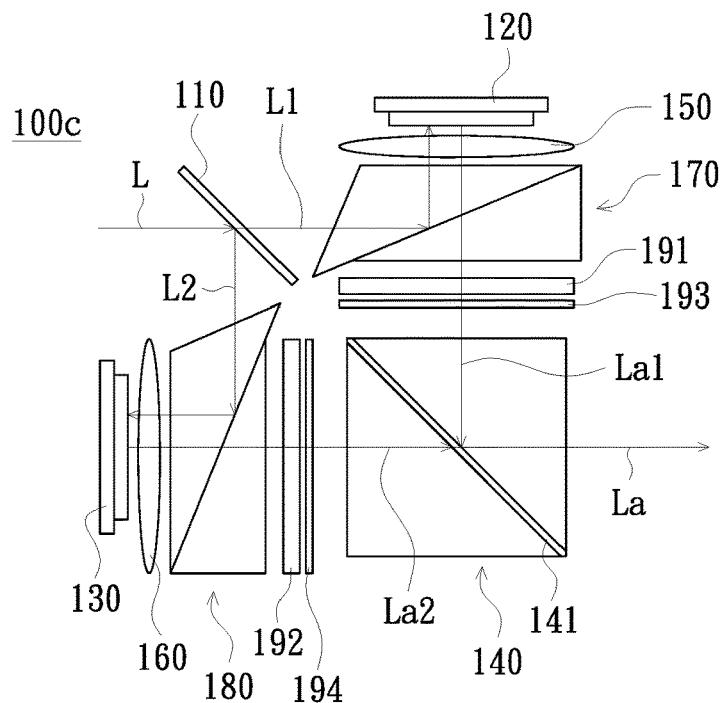
FIG. 4C is a schematic diagram of a light engine module in accordance with another embodiment of the invention.
Figure 5:
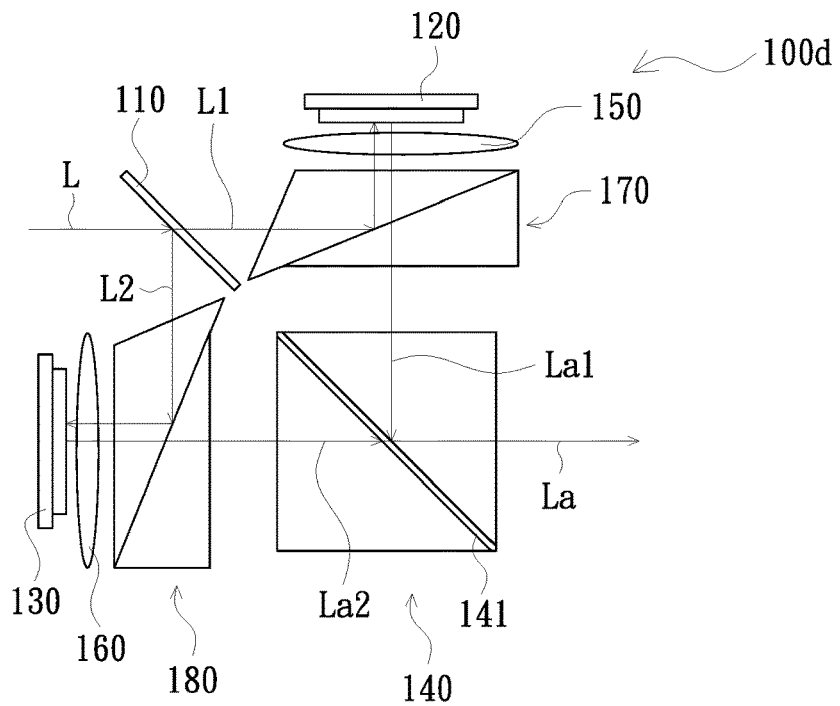
FIG. 5 is a schematic diagram of a light engine module in accordance with another embodiment of the invention.

In a light engine module 100b of another embodiment shown in FIG. 4B, the first light converging element 150 may be disposed between the first light guiding element 170 and the first cover sheet 191, and the second light converging element 160 may be disposed between the second light guiding element 180 and the second cover sheet 192. In the above-mentioned embodiment, the first light converging element 150 is, for example, disposed between the first light guiding element 170 and the light combining element 140, and the second light converging element 160 is, for example, disposed between the second light guiding element 180 and the light combining element 140. In other embodiments, the first light converging element 150 may be disposed between the first light guiding element 170 and the first light valve 120, and the second light converging element 160 may be disposed between the second light guiding element 180 and the second light valve 130, as shown in FIG. 4C. FIG. 4C is a schematic diagram of a light engine module in accordance with another embodiment of the invention. Structures and advantages of a light engine module 100c of the embodiment of FIG. 4C and the light engine module 100a are similar. The main difference is that the first light converging element 150 of the embodiment of FIG. 4C is disposed between the first light valve 120 and the first light guiding element 170, and the second light converging element 160 is disposed between the second light valve 130 and the second light guiding element 180. In addition, in another embodiment, as shown in FIG. 5, a light engine module 100d, for example, does not have the first light path adjusting element 193 and the second light path adjusting element 194. The first light converging element 150 may also be disposed between the first light valve 120 and the first light guiding element 170. The second light converging element 160 may also be disposed between the second light valve 130 and the second light guiding element 180.

Figure 6A:
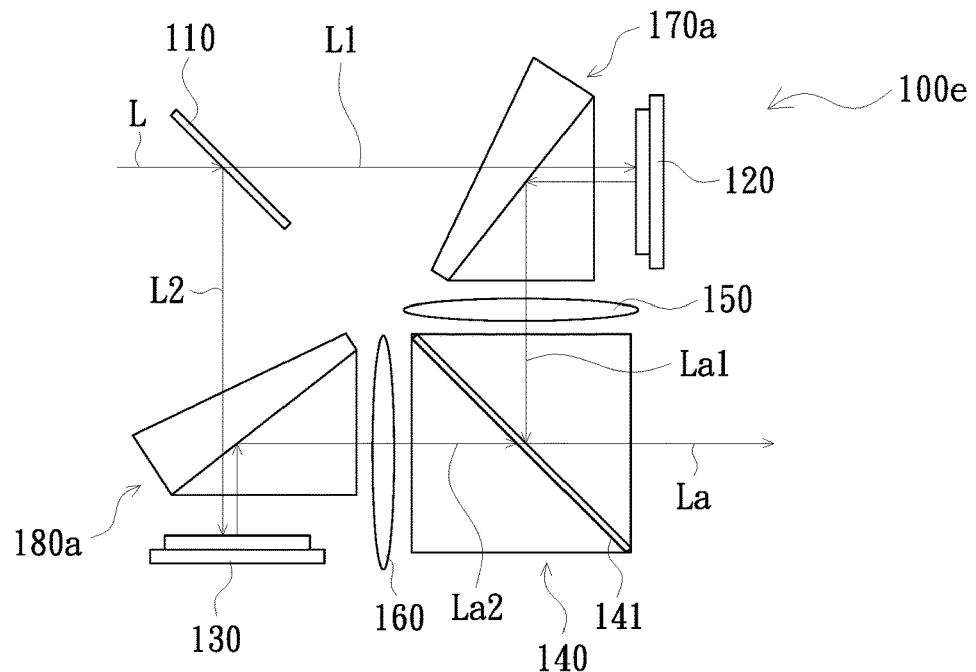
FIG. 6A is a schematic diagram of a light engine module in accordance with another embodiment of the invention.

FIG. 6A is a schematic diagram of a light engine module in accordance with another embodiment of the invention. Please refer to FIG. 6A. Structures and advantages of a light engine module 100e of the embodiment and the light engine module 100 are similar. The following describes main differences in their structures. A first light guiding element 170a of the embodiment is, for example, a first reverse total internal reflection prism (RTIR prism). A second light guiding element 180a is, for example, a second reverse total internal reflection prism. The first light guiding element 170a is used for allowing the first color beam L1 to pass therethrough to be transmitted to the first light valve 120, and is used for reflecting the first image beam La1 from the first light valve 120 to the light combining element 140. The second light guiding element 180a is used for allowing the second color beam L2 to pass therethrough to be transmitted to the second light valve 130, and is used for reflecting the second image beam La2 from the second light valve 130 to the light combining element 140.

Figure 6B:
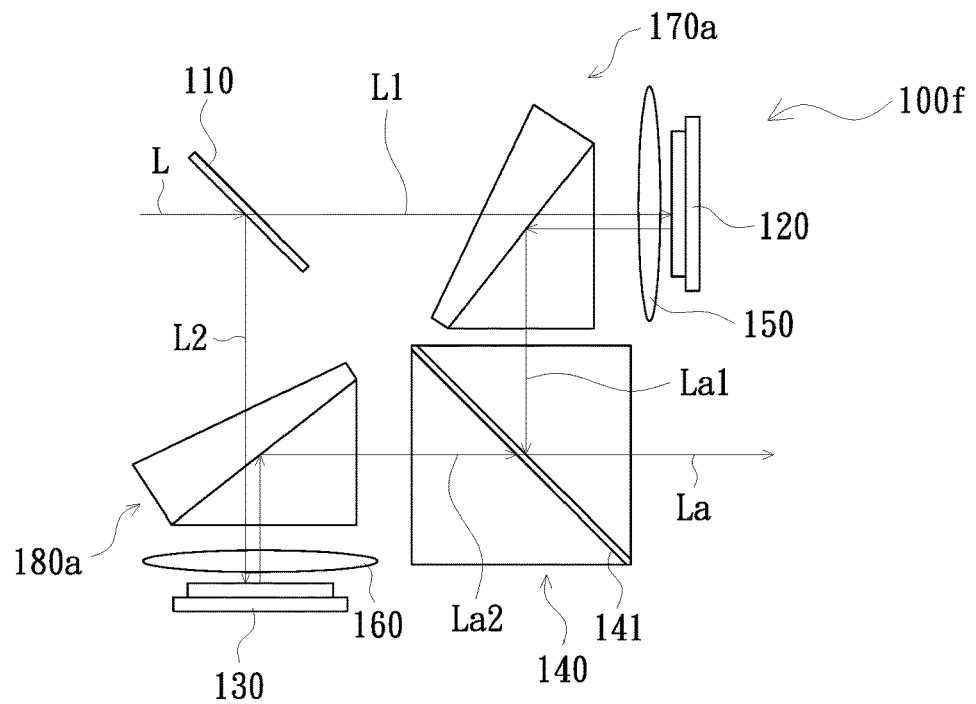
FIG. 6B is a schematic diagram of a light engine module in accordance with another embodiment of the invention.

FIG. 6B is a schematic diagram of a light engine module in accordance with another embodiment of the invention. Please refer to FIG. 6B. Structures of a light engine module 100f of the embodiment and the light engine module 100e are similar. The main difference is that the first light converging element 150 is disposed between the first light valve 120 and the first light guiding element 170a, and the second light converging element 160 is disposed between the second light valve 130 and the second light guiding element 180a.

Figure 7A:
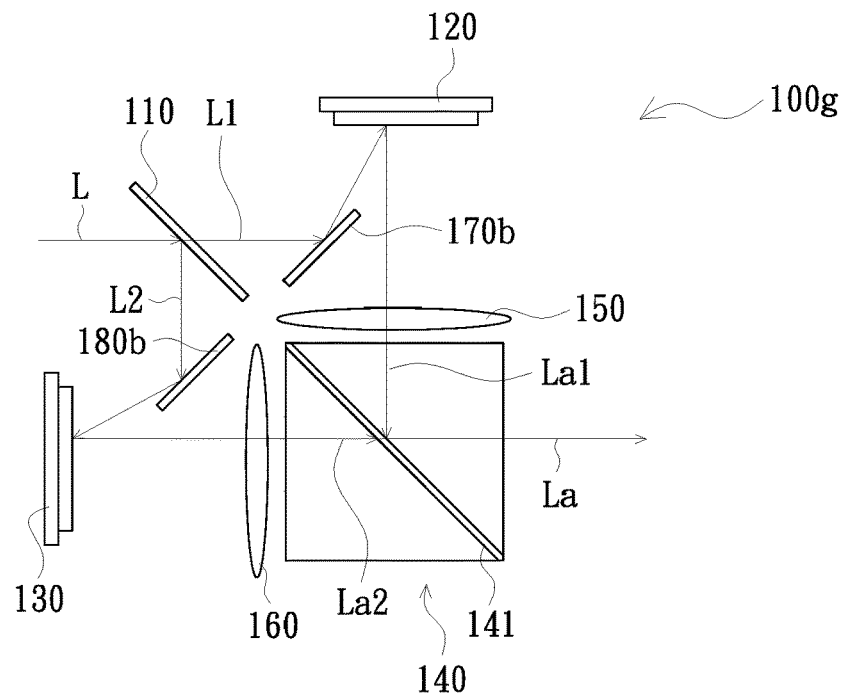
FIG. 7A is a schematic diagram of a light engine module in accordance with another embodiment of the invention.

FIG. 7A is a schematic diagram of a light engine module in accordance with another embodiment of the invention. Please refer to FIG. 7A. Structures and advantages of a light engine module 100g of the embodiment and the light engine module 100 are similar. The following describes main differences in their structures. A first light guiding element 170b and a second light guiding element 180b of the embodiment are both a reflection mirror. The first light guiding element 170b is used for reflecting the first color beam L1 to the first light valve 120, and the first light guiding element 170b deviates from the transmission path of the first image beam La1 to avoid reflecting the first image beam La1. The second light guiding element 180b is used for reflecting the second color beam L2 to the second light valve 130, and the second light guiding element 180b deviates from the transmission path of the second image beam La2 to avoid reflecting the second image beam La2. The first light guiding element 170b and the second light guiding element 180b of the embodiment may, depending on requirements, choose to use planar reflection mirrors or curved reflection mirrors with diopters.

Figure 7B:
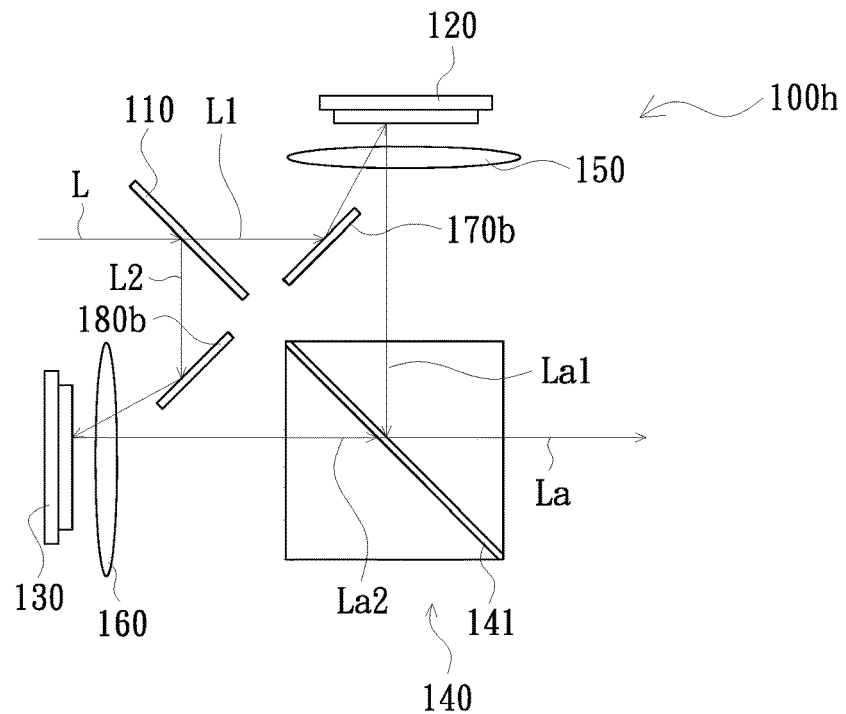
FIG. 7B is a schematic diagram of a light engine module in accordance with another embodiment of the invention.

FIG. 7B is a schematic diagram of a light engine module in accordance with another embodiment of the invention. Please refer to FIG. 7B. Structures of a light engine module 100h of the embodiment and the light engine module 100g are similar. The main difference is that the first light converging element 150 is disposed between the first light valve 120 and the first light guiding element 170b, and the second light converging element 160 is disposed between the second light valve 130 and the second light guiding element 180b.

In summary, the light engine module of the embodiment of the invention can meet the projection requirements for high luminance due to the use of the architecture of two light valves. In addition, since the light engine module is provided with the first light converging element between the first light valve and the light combining element, and is provided with the second light converging element between the second light valve and the light combining element, so that the first image beam and the second image beam are reduced in opening angles when passing through the first light converging element and the second light converging element respectively, the size of the light combining element can be reduced, and thereby the size of the light engine module can be reduced and production costs can be lowered. Compared with known technology, the space for avoiding light interference in the light engine module of the embodiment of the invention can be reduced/omitted. Therefore, the back focal length can be shortened, and the design difficulty of the projection lens can be reduced. Besides, since the light spot of the image beam projected on the projection lens is reduced, a lens with a smaller diameter may be selected and used for the lens at the light incident side (the side facing toward the light combining element) of the projection lens. This way is helpful in selecting and using a projection lens with a smaller volume and can reduce manufacturing costs. Therefore, the projection device of the embodiment of the invention can meet the projection requirements of high luminance, low production costs, and a downsized overall volume.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first dichroic element, the second dichroic element, the first light valve, the second light valve, the first light converging element, the second light converging element, the first light guiding element, the second light guiding element, the first cover sheet, the second cover sheet, the first light path adjusting element, the second light path adjusting element, the first color beam, the second color beam, the first image beam, the second image beam, the first sub-beam, the second sub-beam, the first total internal reflection prism, the second total internal reflection prism, the first reverse total internal reflection prism, the second reverse total internal reflection prism, the first portion, and the second portion are only used for distinguishing various elements and do not limit the number of the elements.

What is claimed is:

1. A projection device, comprising:
    a light source module, adapted to provide an illumination beam, wherein the illumination beam comprises a first wavelength range and a second wavelength range;
    a light engine module, comprising:
        a first dichroic element, disposed on a transmission path of the illumination beam and used for dividing the illumination beam into a first color beam and a second color beam, wherein the first color beam comprises the first wavelength range, the second color beam comprises the second wavelength range, the first wavelength range of the illumination beam passes through the first dichroic element to form the first color beam, and the second wavelength range of the illumination beam is reflected by the first dichroic element to form the second color beam;
        a first light valve, disposed on a transmission path of the first color beam and used for converting the first color beam into a first image beam;
        a second light valve, disposed on a transmission path of the second color beam and used for converting the second color beam into a second image beam;
        a light combining element, disposed on transmission paths of the first image beam from the first light valve and the second image beam from the second light valve;
        a first light converging element, disposed between the first light valve and the light combining element;
        a second light converging element, disposed between the second light valve and the light combining element;
        a first light guiding element, disposed among the first dichroic element, the first light valve and the light combining element, and used for guiding the first color beam to the first light valve; and
        a second light guiding element, disposed among the first dichroic element, the second light valve and the light combining element, and used for guiding the second color beam to the second light valve; and
    a projection lens, disposed on a transmission path of the first image beam and the second image beam from the light combining element, wherein the light combining element is disposed among the projection lens, the first light valve and the second light valve, the light combining element is disposed among the projection lens, the first light converging element and the second light converging element, and the light combining element is disposed among the projection lens, the first light guiding element and the second light guiding element.

2. The projection device according to claim 1, wherein the first light converging element is disposed between the first light valve and the first light guiding element, and the second light converging element is disposed between the second light valve and the second light guiding element.

3. The projection device according to claim 1, wherein the first light converging element is disposed between the light combining element and the first light guiding element, and the second light converging element is disposed between the light combining element and the second light guiding element.

4. The projection device according to claim 3, wherein the light combining element is a light combining prism, and the first light converging element and the second light converging element are disposed on two surfaces of the light combining element.

5. The projection device according to claim 1, wherein the first light guiding element and the second light guiding element are a first total internal reflection prism and a second total internal reflection prism respectively, the first total internal reflection prism is used for reflecting the first color beam to the first light valve and is used for allowing the first image beam from the first light valve to pass therethrough to be transmitted to the light combining element, and the second total internal reflection prism is used for reflecting the second color beam to the second light valve and is used for allowing the second image beam from the second light valve to pass therethrough to be transmitted to the light combining element.

6. The projection device according to claim 1, wherein the first light guiding element and the second light guiding element are a first reverse total internal reflection prism and a second reverse total internal reflection prism respectively, the first reverse total internal reflection prism is used for allowing the first color beam to pass therethrough to be transmitted to the first light valve and is used for reflecting the first image beam from the first light valve to the light combining element, and the second reverse total internal reflection prism is used for allowing the second color beam to pass therethrough to be transmitted to the second light valve and is used for reflecting the second image beam from the second light valve to the light combining element.

7. The projection device according to claim 1, wherein the first light guiding element and the second light guiding element are two reflection mirrors, the two reflection mirrors are used for reflecting the first color beam and the second color beam to the first light valve and the second light valve respectively, and the two reflection mirrors are not located on transmission paths of the first image beam and the second image beam.

8. The projection device according to claim 1, wherein the light engine module further comprises:
a first light path adjusting element, disposed beside the first light valve and located on a transmission path of the first image beam; and
a second light path adjusting element, disposed beside the second light valve and located on a transmission path of the second image beam.

9. The projection device according to claim 1, wherein the light source module comprises:
an excitation light source, for providing an excitation beam;
a wavelength conversion element, disposed on a transmission path of the excitation beam and used for converting the excitation beam into a conversion beam;
a second dichroic element, disposed between the excitation light source and the wavelength conversion element, and used for allowing the excitation beam to pass therethrough, and used for reflecting the conversion beam; and
a reflective element group, disposed on a transmission path of the excitation beam and used for reflecting the excitation beam to allow the excitation beam to pass through the second dichroic element, wherein the illumination beam comprises the conversion beam and the excitation beam.

10. The projection device according to claim 9, wherein the first dichroic element is used for dividing the conversion beam into a first sub-beam and a second sub-beam having different colors, and is used for allowing the first sub-beam and the excitation beam to pass therethrough, and is used for reflecting the second sub-beam, the first color beam comprises the first sub-beam and the excitation beam, and the second color beam comprises the second sub-beam.

11. The projection device according to claim 9, wherein the first dichroic element is used for dividing the conversion beam into a first sub-beam and a second sub-beam having different colors, and is used for allowing the first sub-beam to pass therethrough, and is used for reflecting the second sub-beam and the excitation beam, the first color beam comprises the first sub-beam, and the second color beam comprises the second sub-beam and the excitation beam.

12. A light engine module, comprising:
a first dichroic element, used for dividing an illumination beam into a first color beam and a second color beam, wherein
the illumination beam comprises a first wavelength range and a second wavelength range, the first color beam comprises the first wavelength range, the second color beam comprises the second wavelength range, and the first wavelength range of the illumination beam passes through the first dichroic element to form the first color beam, and the second wavelength range of the illumination beam is reflected by the first dichroic element to form the second color beam;
a first light valve, disposed on a transmission path of the first color beam and used for converting the first color beam into a first image beam;
a second light valve, disposed on a transmission path of the second color beam and used for converting the second color beam into a second image beam;
a light combining element, disposed on transmission paths of the first image beam from the first light valve and the second image beam from the second light valve;
a first light converging element, disposed between the first light valve and the light combining element;
a second light converging element, disposed between the second light valve and the light combining element;
a first light guiding element, disposed among the first dichroic element, the first light valve and the light combining element, and used for guiding the first color beam to the first light valve; and
a second light guiding element, disposed among the first dichroic element, the second light valve and the light combining element, and used for guiding the second color beam to the second light valve.

13. The light engine module according to claim 12, wherein the first light converging element is disposed between the first light valve and the first light guiding element, and the second light converging element is disposed between the second light valve and the second light guiding element.

14. The light engine module according to claim 12, wherein the first light converging element is disposed between the light combining element and the first light guiding element, and the second light converging element is disposed between the light combining element and the second light guiding element.

15. The light engine module according to claim 14, wherein the light combining element is a light combining prism, and the first light converging element and the second light converging element are disposed on two surfaces of the light combining element.

16. The light engine module according to claim 12, wherein the first light guiding element and the second light guiding element are a first total internal reflection prism and a second total internal reflection prism respectively, the first total internal reflection prism is used for reflecting the first color beam to the first light valve and is used for allowing the first image beam from the first light valve to pass therethrough to be transmitted to the light combining element, and the second total internal reflection prism is used for reflecting the second color beam to the second light valve and is used for allowing the second image beam from the second light valve to pass therethrough to be transmitted to the light combining element.

17. The light engine module according to claim 12, wherein the first light guiding element and the second light guiding element are a first reverse total internal reflection prism and a second reverse total internal reflection prism respectively, the first reverse total internal reflection prism is used for allowing the first color beam to pass therethrough to be transmitted to the first light valve and is used for reflecting the first image beam from the first light valve to the light combining element, and the second reverse total internal reflection prism is used for allowing the second color beam to pass therethrough to be transmitted to the second light valve and is used for reflecting the second image beam from the second light valve to the light combining element.

18. The light engine module according to claim 12, wherein the first light guiding element and the second light guiding element are two reflection mirrors, the two reflection mirrors are used for reflecting the first color beam and the second color beam to the first light valve and the second light valve respectively, and the two reflection mirrors are not located on transmission paths of the first image beam and the second image beam.

19. The light engine module according to claim 12, further comprising:
- a first light path adjusting element, disposed beside the first light valve and located on a transmission path of the first image beam; and
- a second light path adjusting element, disposed beside the second light valve and located on a transmission path of the second image beam.

\* \* \* \* \*